(12) United States Patent
Ruparelia et al.

(10) Patent No.: US 8,589,200 B2
(45) Date of Patent: Nov. 19, 2013

(54) MANAGING AN INFORMATION TECHNOLOGY SYSTEM

(75) Inventors: Nayan Bhagwanji Ruparelia, Leavesden (GB); Guy Mitchell, Aurora, CO (US); Max Boehm, Holzwickede (DE); Alfred Walther, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 13/171,145

(22) Filed: Jun. 28, 2011

(65) Prior Publication Data

US 2013/0006679 A1 Jan. 3, 2013

(51) Int. Cl.
*G06Q 10/00* (2012.01)
(52) U.S. Cl.
USPC ........................................ 705/7.11
(58) Field of Classification Search
USPC ........................................ 705/7.11
See application file for complete search history.

(56) References Cited

U.S. PATENT DOCUMENTS

| | | | | |
|---|---|---|---|---|
| 6,430,536 | B2* | 8/2002 | Irving et al. | 705/2 |
| 7,266,515 | B2* | 9/2007 | Costello et al. | 705/26.8 |
| 7,490,031 | B1 | 2/2009 | Qiu et al. | |
| 7,707,015 | B2 | 4/2010 | Lubrecht et al. | |
| 7,747,460 | B2* | 6/2010 | Vandrilla | 705/7.35 |
| 7,747,738 | B2* | 6/2010 | Ellisor, Jr. | 709/224 |
| 7,945,478 | B2* | 5/2011 | Hogan et al. | 705/20 |
| 8,161,045 | B2* | 4/2012 | Arnold et al. | 707/736 |
| 2002/0152310 | A1 | 10/2002 | Jain et al. | |
| 2008/0301601 | A1 | 12/2008 | Ng et al. | |
| 2010/0080334 | A1 | 4/2010 | Sohn et al. | |
| 2011/0087601 | A1* | 4/2011 | Apte et al. | 705/52 |
| 2011/0106501 | A1* | 5/2011 | Christian et al. | 703/1 |
| 2011/0264418 | A1* | 10/2011 | Szewczyk et al. | 703/2 |
| 2012/0109662 | A1* | 5/2012 | Shah et al. | 705/1.1 |

OTHER PUBLICATIONS

DSouza (WorldPress plugin Compatibility Checker), Jun. 2009, Weblogs tools Collection, pp. 1-10.*

* cited by examiner

*Primary Examiner* — Romain Jeanty

(57) ABSTRACT

According to one example, there is provided a method of managing an information technology (IT) system that comprising items of IT equipment. The method comprises obtaining a set of characteristics from items of IT equipment in the IT system, generating, using the obtained sets of characteristics, a consolidated set of characteristics representing at least part of the IT system, identifying, based on the generated consolidated set of characteristics, an item of IT equipment to be replaced, determining a set of minimum characteristics for a replacement item to replace the identified item; and selecting, from an IT equipment database, based on the determined characteristics, a replacement item of IT equipment.

17 Claims, 3 Drawing Sheets

MANAGING AN INFORMATION TECHNOLOGY SYSTEM

BACKGROUND

The management of IT infrastructures, especially large IT infrastructures having many hundreds or thousands of items of IT equipment, is a particularly complex task. Often, computer hardware in the IT infrastructure has a shelf-life longer than that of the operating systems and software applications that run on the computer hardware. Accordingly, as operating systems and software applications are added, replaced, or are upgraded, at some point in time computer hardware in the IT infrastructure may be deemed to no longer be suitable. However, determining which items of IT equipment to replace and when they should be replaced is a non-trivial exercise for an IT manager.

BRIEF DESCRIPTION

Examples will now be described, by way of non-limiting example only, with reference to the accompanying drawings, in which.

DETAILED DESCRIPTION

Figure 1:
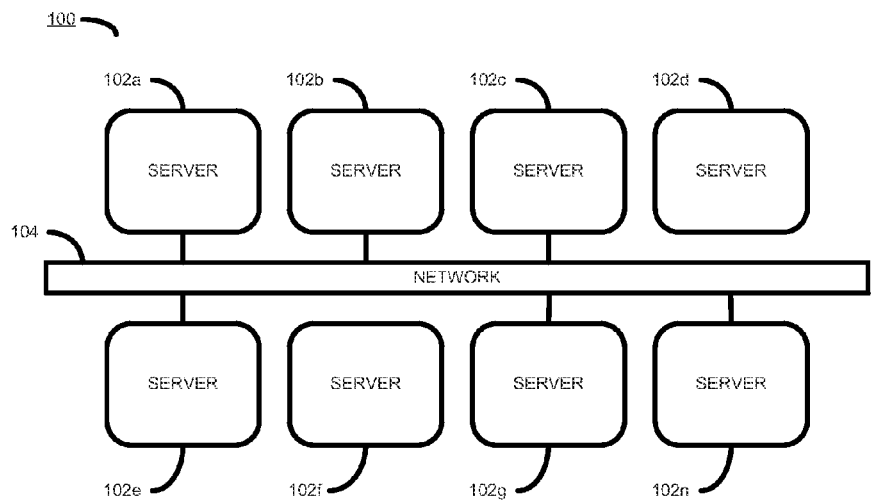
FIG. 1 is a simplified block diagram showing part of an IT infrastructure.

Referring now to FIG. 1 there is shown a block diagram illustrating a set of items of IT equipment, or IT assets, 102a to 102n in an IT environment or system 100. The IT equipment 102a to 102n may include, for example, computer servers, desktop computers, tablet computing devices, laptop computers, and the like. At least some of the IT equipment may be connected to a network 104. The IT environment 100 may form, for example, part of a data center and the IT equipment 102a to 102n may be located in the same or in diverse geographic locations.

Each item of IT equipment 102 may be used, for example, for running one or multiple operating systems, and one or multiple software applications.

Over time, items of the IT equipment 102a to 102n may have to be replaced or updated, or new items of IT equipment may be added to the IT environment 100. This may be due, for example, to existing equipment becoming old, malfunctioning, becoming obsolete, no longer having suitable processing characteristics to meet the demands of the IT environment 100, and so on.

Figure 2:
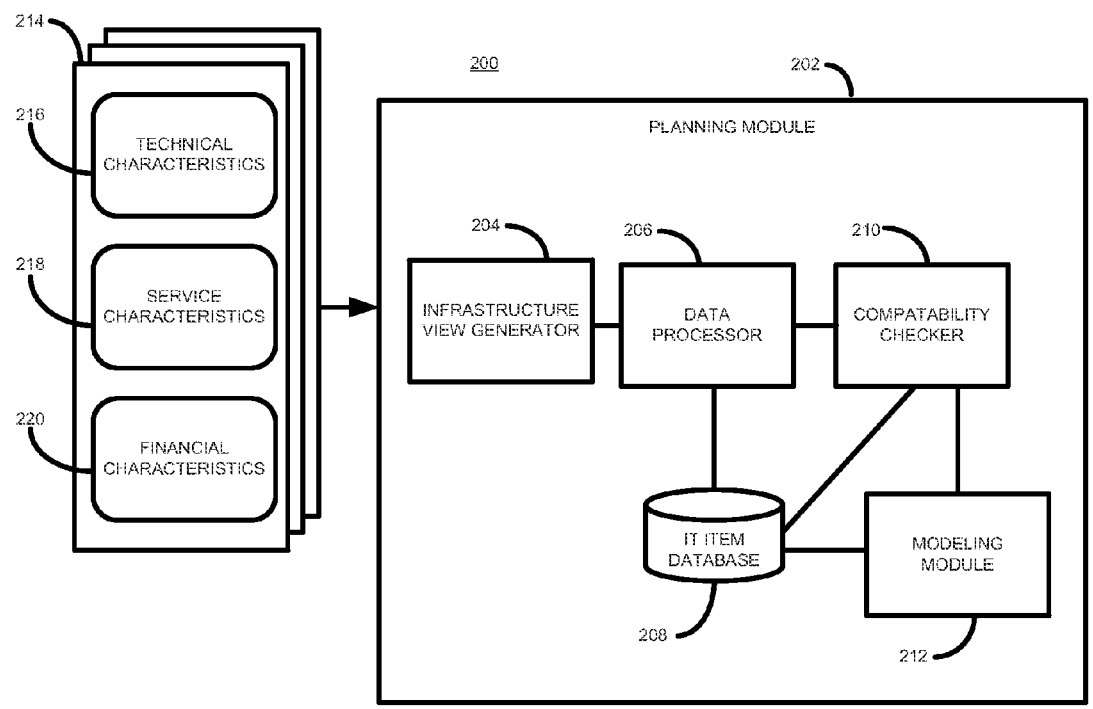
FIG. 2 is a simplified block diagram showing an IT infrastructure planning module according to principles described herein.

Referring now to FIG. 2, there is shown a simplified block diagram of a system 200 according to principles described herein. The system 200 includes a planning module 202 which may be used to analyze the IT infrastructure 100 and to identify an item or items of the IT infrastructure suitable for being replaced. Additionally, the planning module 202 may identify a new item of IT equipment (e.g. a replacement item) that may be used to replace the identified item. The planning module 202 may further ensure that the selected replacement item is compatible with other items of IT equipment in the IT infrastructure 100. The planning module 202 may additionally ensure that the selected replacement item remains suitable for use at a future time, based on projected changes in different characteristics of the IT infrastructure and its usage. In a further example, the planning module 202 may generate a model of the state of the IT infrastructure including the selected replacement item, to allow further items of the IT infrastructure to be selected for replacement.

Figure 3A:
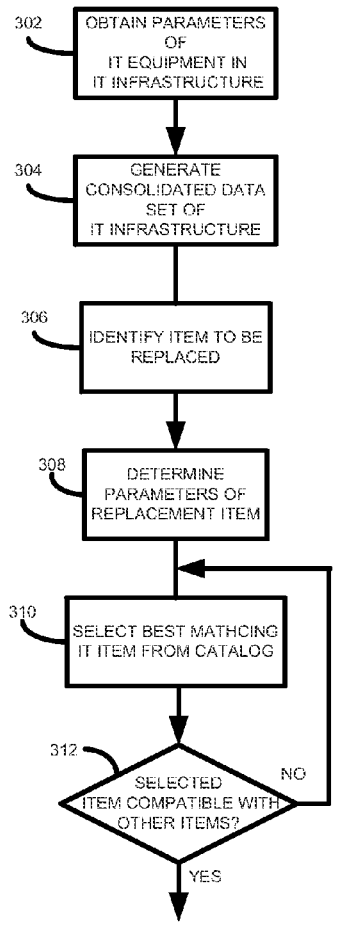
FIG. 3a is a simplified flow diagram outlining an example method according to principles described herein.
Figure 3B:
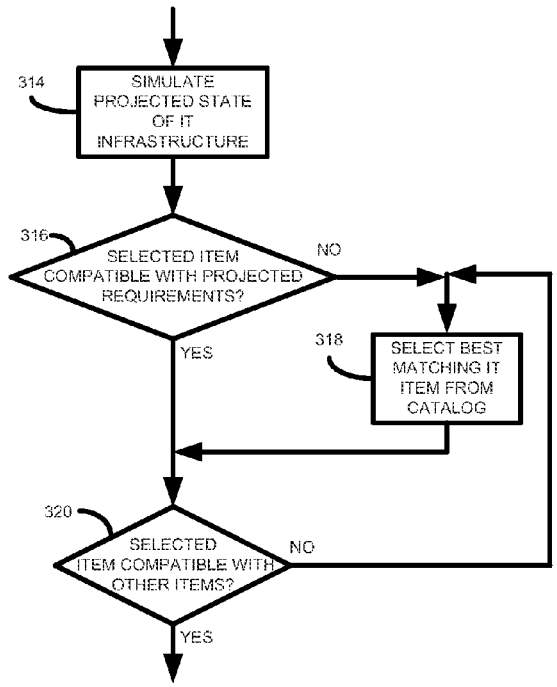
FIG. 3b is a simplified flow diagram outlining an example method according to principles described herein.
Figure 3C:
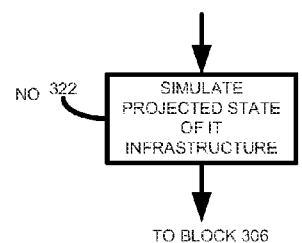
FIG. 3c is a simplified flow diagram outlining an example method according to principles described herein.

Operation of the planning module 202 will now be described with further reference to FIGS. 3a, 3b, and 3c.

The planning module 202 comprises an infrastructure view generator 204 which obtains (block 302, FIG. 3a) a set 214 of parameters from different ones of the items of IT equipment 102. Each set 214 of parameters may comprise data relating to different types of IT equipment characteristics. In one example a set 214 of parameters may include data relating to technical characteristics, service characteristics, and financial characteristics of an item of IT equipment. In other examples a set of parameters may comprises data relating to more or less types of equipment characteristics.

Technical characteristics 216 may include, for example, details of network interfaces, power consumption, amount of memory installed, number and type of core processing units, operating system installed, physical server dimensions, and the like. Service characteristics 218 may include, for example, details of software applications installed or executing on a server, details of a service level agreement (SLA), length of support contract, and warranty length. Financial characteristics 220 may include, for example, details of the total cost of ownership (TCO) of the server, a lease period (where applicable), and server cost.

Example technical characteristics, service characteristics, and financial characteristics are shown below in Tables 1, 2, and 3.

TABLE 1

EXAMPLE OF TECHNICAL CHARACTERISTICS

| PARAMETER | VALUE |
|---|---|
| Operating System: | Windows Server 2008 64 bits |
| Minimum memory required: | 8 GB |
| Average memory utilization: | 5 GB |
| Average CPU utilization: | 30% |
| Minimum local storage: | 500 GB |
| No. of IP addresses required: | 1 |
| No. of ports required: | 10 |
| Redundancy level: | High |
| . . . | |

TABLE 2

EXAMPLE OF SERVICE CHARACTERISTICS

| PARAMETER | VALUE |
|---|---|
| Security Classification: | Stringent |
| Service Level Agreement: | (performance) 3 ms user response time |
| Min. support contract: | 1 year |
| Warranty period: | 3 years |
| Desired currency: | N |
| Application #1 - Name: | Microsoft Exchange Server |
| Application #1 - Version | X.Y |
| Application #1 - Response Time | N seconds |
| Application #1 Interface (Port and protocol) | Port K, Protocol L |
| . . . | . . . |

TABLE 3

EXAMPLE OF FINANCIAL CHARACTERISTICS

| PARAMETER | VALUE |
|---|---|
| Availability: | 99.9% in 1 year |
| TCO: | $1 per day |
| Environmental Factor: | 250 W power consumption |
| Lease period: | 2 years |
| ... | ... |

In one example a set of parameters 214 may include threshold data that indicates when a particular item may be considered to be overloaded, or be considered for replacement. For example, a threshold value may indicate an average acceptable memory or processor utilization level over a given period of time.

In one example a parameter may have an associated weighting factor or prioritization level. Such weightings may, for example, be assigned manually by an IT manager, or automatically using predetermined weightings based on parameter type. The weightings may be used to indicate the relative importance of different parameters.

The infrastructure view generator 204 obtains the sets 214 of parameters in any suitable manner. For example, it may interrogate individual items of IT equipment, may use remote monitoring applications, may interrogate a computer management database (CMDB), an enterprise architecture data store, or use other suitable techniques.

At 304 the infrastructure view generator 204 generates a consolidated data view or dataset representing at least part of the IT infrastructure 100. In one example, the server estate data includes data relating to all of the computing devices 102. In another example, the server estate data includes data relating to a sub-set of the computing devices 102. An example extract of a consolidated dataset from one of the computing devices 102 is shown below in Table 4.

At 306 a data processor 206 is used to process the generated consolidated dataset to identify an item or items of IT equipment in the IT infrastructure 100 that may benefit from being replaced.

In one example, the data processor 206 analyzes the generated consolidated dataset to identify an item of IT equipment 102 suitable for being replaced.

In one example, the data processor 206 determines whether an item of IT equipment 102 has particular characteristics that have a value above an associated threshold value. The associated threshold value may, in one example, be included in the set of characteristics 214, or may, in a further example, be specific to the item of IT equipment 102 associated therewith. In a further example, a threshold value may be a general threshold value used by the planning module 202 and applicable to multiple items of IT equipment 102.

In one example, the data processor 206 analyzes the generated consolidated data set and assigns a score, ranging, for example, from 0 to 99, to each item of IT equipment based on how that item compares to an associated threshold value. In one example a weighting value may be used in the generation of the score. The final score may be used to identify an item of IT equipment as being suitable for replacement. For example, the data processor 206 may identify a computer server having an average CPU utilization and memory utilization above a predetermined threshold level for over a predetermined duration as being suitable for replacement.

In a further example, the data processor 206 may analyze the generated consolidated data set and assign a rank or score to each item of IT equipment based on how up-to-date the particular item of IT equipment is, or how up-to-date an operating system or application running on that item is. For example, an item of IT equipment having a previous version of a particular operating system may obtain a higher score than an item of IT equipment having the latest version of the operating system.

TABLE 4

EXAMPLE EXTRACT OF CONSOLIDATED DATASET

| CATEGORY | ATTRIBUTE/PARAMETER | DESCRIPTION |
|---|---|---|
| General | Server | GB001WASH2001 |
| | Rack | AE2B |
| | Data-centre | Washington |
| | I/P Address | 10.6.1.125 |
| | Model | BL680c |
| | Physical Memory | 64 GB |
| | Number of CPUs | 4 |
| | CPU type | Intel Xeon 2.4 GHz |
| | Warranty end date | 24-01-2015 |
| | Date of Purchase | 25-01-2010 |
| | Power Consumption | 80 W |
| | VM Host | Yes |
| | Operating System | VMWare |
| Applications | | |
| Application #1 | Name of application | General Ledger v1 |
| | Guest Operating System | Windows Server 2008 R2 |
| | Integration | Oracle 11g; Account Profiler v2; Kondor+. |
| | Ports | 121 |
| | Function | Aggregates the open positions on a daily basis for accounting and risk exposure. |
| Application #2 | Name of application | Oracle 11g |
| | Guest Operating System | RHEL 6 |
| | Integration | General Ledger v1. |
| | Ports | 454 |
| | Function | Database for general ledger trades and open positions. |
| ... | ... | ... |

In one example multiple characteristics and factors may be taken into account when assigning a score.

In a further example the data processor 206 generates a visual representation of the consolidated dataset. A visual representation may include, for example, a textual or data view of the data, and a graphical view of the data. In one example, a graphical view may be generated using gridmaps, treemaps, or any other suitable visualization technique. The visual representation may be displayed, for example or a suitable computer display (not shown), using an interactive visualization application, such as a browser application, to an IT manager who may then use the visualization to browse the consolidated data set and to manually identify an item or items for replacement. The manually identified item may be sent, by the visualization application, to be received by the data processor 206.

Once an item of IT equipment to be replaced has been determined, the data processor 206 determines (308) a minimum set of characteristics that a replacement item of IT equipment should have. For example, if the current item of IT equipment has 5 Gb of memory, has an associated memory usage threshold of 45%, and has an average actual memory usage of 50%, the data processor 206 may determine that a replacement item of IT equipment should have at least 7.5 Gb of memory to enable the average memory usage (based on current usage levels) to be 25% or some other predetermined percentage.

At 310 the data processor 206 selects, using the identified minimum set of characteristics, an item of IT equipment described in an IT item database 208. The database 208 comprises data relating to items of IT equipment available for purchase or order along with corresponding characteristics, such as technical characteristics or technical specifications, financial characteristics, and service characteristics. The data processor 206 may search the database 208 using the identified minimum set of characteristics as search keys. In one example the IT item database 208 may have a search interface (not shown) that enables the data processor 206 to identify, for example based on a closest match, best suitability, or other satisfactorily suitable replacement item of IT equipment.

Once the data processor 206 has selected a replacement item of IT equipment a compatibility checker module 210 determines (312) whether the selected replacement item is compatible with other items of IT equipment 102 in the IT infrastructure. Compatibility may be determined in a number of different manners. In one example, the infrastructure view generator 204 may determine that one item of IT equipment is linked in some way to or has a dependency on another item of IT equipment. Such information may be detailed in, or be derivable from, the previously generated consolidated dataset. Accordingly, the data processor 206 checks compatibility with any IT equipment linked to or associated with an identified item of IT equipment.

For example, a first application running on a first computer server may provide data to a second application running on a second computer server. In such a case, if the first server is replaced with a new server running a later version of an operating system on which the first application is not able to run, it can be determined that replacement computer server is not compatible.

If the compatibility checker 210 determines that the selected replacement item is not compatible, it informs (312) the data processor 206 which then selects (310) an alternative item of IT equipment from the IT item database 208. An alternative item may be selected in a similar manner to the way in which the original replacement item was selected, ensuring that the originally selected replacement item is not re-selected.

In a further example, in case of non-compatibility the data processor 206 may determine whether any linked items may additionally be selected as being suitable for being replaced.

In one example, at this point the selected replacement item (or items) may be ordered automatically through a procurement system (not shown).

In a further example a report is generated for an IT manager detailing the item identified to be replaced and the replacement item chosen from the IT item database, to enable an IT manager to verify the selection and to manually place an order using an appropriate procurement system (not shown).

The above-described examples enable the planning module 202 to select an item of IT equipment to replace an existing item of IT equipment such that the replacement item meets the current usage requirements of the selected item.

In a further example, however, a modeling module 212 is used to help ensure that the selected replacement item is a suitable choice taking into account projected future characteristics of the IT infrastructure 100, as described below with further reference to FIG. 3b.

At block 314 the modeling module 212 estimates or calculates projected characteristics of different items of IT equipment 102 at some point in the future. In one example, the modeling module 212 determines a set of future minimum characteristics at a future point in time of the selected replacement item selected in block 310.

The estimated characteristics may be derived, for example, by deriving future projections based on historical data relating to different ones of the item of IT equipment 102. For example, for each or multiple items of IT equipment 102 a trend may be determinable for a particular characteristic or characteristics, and a future projection may be made based on the determined trend. For example, if historical data shows that, for a given server, processor usage has increased 5% per year for the last 3 years, the modeling module 212 may determine that this trend will continue for the coming years. In one example historical data may be stored in a CMDB or other suitable repository.

The modeling module 212 therefore determines (314) a projected or estimated consolidated dataset or view at a future point in time. In one example, the future point in time is selected by an IT manager and may, for instance, be a time period from 1 to 5 years. In other examples a longer or shorter period may be chosen.

At 316 the compatibility checker module 210 determines whether the replacement item of IT equipment selected in block 310 is compatible with the projected future state of the IT infrastructure 100. If the compatibility checker 210 determines that the selected item of IT equipment is not compatible the data processor 206 determines (318) a new or updated set of characteristics that would be suitable, and these are used to select an alternative item in block 318. Compatibility may be determined, for example, using techniques similar to those described above.

Otherwise, at block 320, the data processor 206 determines whether the selected replacement item is compatible with the other items of IT equipment in the projected future state of the IT infrastructure 100. If no, a new replacement item is selected at block 318. Otherwise, the selected replacement item is deemed to be a suitable replacement item, having taken into account current and present IT infrastructure characteristics, as well as having taken into account the characteristics of other items of IT infrastructure in the IT infrastructure 100.

In a further example, once a replacement item of IT equipment has been selected the modeling module 212 updates (322) the projected state of the IT infrastructure 100 including characteristics of the selected replacement item, and the process returns to block 306 to identify a further item of IT equipment that is suitable for replacement.

In this way multiple items of replacement IT equipment may be selected one-by-one in which each replacement item is checked to ensure both compatibility with future requirements for that item, as well as ensuring compatibility with other items in the IT infrastructure.

In a yet further example the planning module 202 generates an output of the projected state of the IT infrastructure generated at block 322 in a suitable format. For example, a suitable format may be a file or document using a markup language such as XML. In another example, the planning module may provide a visual representation of the projected state of the IT infrastructure generated at block 322, for example using a treemap, gripmap, or other suitable visualization technique. In this way, an IT manager can view and browse the projected state of the IT infrastructure to make additional planning or management decisions.

In a still further example the planning module 202 determines whether an item determined as being suitable for replacement may be upgraded, for example by adding or changing components such as memory components, storage components, networking components, etc. rather than replaced with a new replacement item. In this case, the data processor 206 may, at block 310, identify one or more components from an IT component database (not shown) the addition of which would enable an existing item of IT equipment to meet the minimum set of characteristics determined at block 308.

Figure 4:
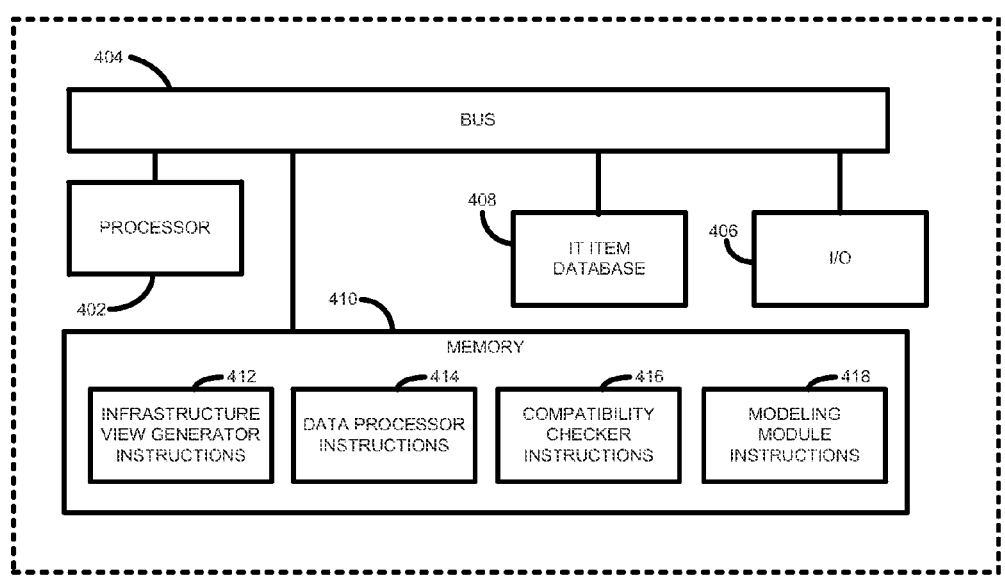
FIG. 4 is a simplified block diagram outlining an example implementation according to principles described herein.

In a further example, as illustrated in FIG. 4, at least part of the planning module 202 may be implemented using a microprocessor 402 coupled, via a communication bus 404, to an input/output module 406, a datastore 408, and a memory 410. The datastore 408 stores IT equipment catalog data. The memory 410 stores infrastructure view generator instructions 412, data processor instructions 414, compatibility checker instructions 416, and modeling module instructions 418. The instructions 412, 414, 416, and 418 are processor understandable instructions that when executed by the processor 402 provide functionality of a planning module as described above.

It will be appreciated that examples of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the principles described herein. Examples may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of managing an information technology, IT, system comprising items of IT equipment, the method comprising:
    obtaining, by a system having a processor, a set of characteristics from items of IT equipment in the IT system;
    generating, by the system using the obtained sets of characteristics, a consolidated set of characteristics representing at least part of the IT system;
    identifying, by the system based on the generated consolidated set of characteristics, an item of IT equipment to be replaced;
    determining, by the system, of minimum characteristics for a replacement item to replace the identified item, wherein the determining comprises estimating for the identified item projected minimum characteristics at a predetermined future point in time; and
    selecting, by the system from an IT equipment database, based on the estimated minimum characteristics, a replacement item of IT equipment.

2. The method of claim 1, further comprising determining, based on the consolidated set of characteristics, whether the selected replacement item is compatible with other items of IT equipment in the IT system, and in response to determining that the selected replacement item is not compatible with the other item of IT equipment, selecting an alternative replacement item from the database.

3. The method of claim 1, further comprising:
    generating a projected consolidated set of characteristics of items of the IT system by estimating future consolidated characteristics at a predetermined future point in time based on the generated consolidated set of characteristics.

4. The method of claim 3, further comprising determining whether the selected replacement item is compatible with the estimated future consolidated characteristics; and, in response to determining that the selected replacement item is not compatible with the estimated future consolidated characteristics, determining an alternative replacement item of IT equipment.

5. The method of claim 4, further comprising generating future consolidated characteristics including projected future characteristics of the selected replacement item.

6. The method of claim 5, further comprising generating an output of the generated future consolidated characteristics.

7. The method of claim 1, wherein the characteristics include at least one of technical characteristics, service characteristics, and financial characteristics.

8. The method of claim 1, further comprising:
    generating a visualization of the consolidated set of characteristics;
    presenting the generated visualization to a user; and
    receiving, from a user input, a selection of an item of IT equipment to be replaced.

9. A system for managing a set of IT assets in an IT system, comprising:
- an IT system view generator for obtaining, for at least some of the IT assets, a set of IT asset characteristics, and for generating therefrom a consolidated set of IT asset characteristics;
- a processor for:
  - processing the generated consolidated set of IT asset characteristics to identify an IT asset suitable for replacement;
  - estimating a minimum set of characteristics at a future point in time for a replacement item to replace the identified IT asset;
  - selecting, from an IT asset database, a replacement item satisfying at least the estimated minimum set of characteristics.

10. The system of claim 9, further comprising a compatibility checker for determining whether the selected replacement item is compatible with other IT assets in the IT system.

11. The system of claim 10, further comprising a modeling module for estimating the minimum set of characteristics based on historical characteristics of the identified IT asset.

12. The system of claim 11, wherein the modeling module is further arranged to generate, based on historical characteristics of the consolidated set of IT asset characteristics, an estimated future consolidated set of IT asset characteristics at a predetermined future point in time.

13. The system of claim 12, wherein the compatibility checker is further arranged to determine whether the estimated minimum set of characteristics of the selected replacement item is compatible with the estimated future consolidated set of IT asset characteristics.

14. The system of claim 13, further comprising an output module for generating an output of the estimated future consolidated set of IT asset characteristics.

15. A non-transitory machine-readable medium that stores machine-readable instructions executable by a processor to provide a method of managing an IT system comprising items of IT equipment, the machine-readable medium comprising machine readable instructions that, when executed by the processor:
- obtain a set of characteristics from items of IT equipment in the IT system;
- generate, using the obtained sets of characteristics, a consolidated set of characteristics representing at least part of the IT system;
- identify, based on the generated consolidated set of characteristics, an item of IT equipment to be replaced;
- estimate, for the identified item of IT equipment, projected minimum characteristics at a predetermined future point in time;
- select, from an IT equipment database, based on the estimated minimum characteristics, a replacement item of IT equipment to replace the identified item; and
- determine, based on the consolidated set of characteristics, whether the selected replacement item is compatible with other items of IT equipment in the IT system.

16. The machine-readable medium of claim 15, further comprising machine readable instructions that, when executed by the processor:
- generate a projected consolidated set of characteristics of items of the IT system by estimating future consolidated characteristics at a predetermined future point in time based on the generated consolidated set of characteristics.

17. The machine-readable medium of claim 15, further comprising machine readable instructions that, when executed by the processor:
- determine whether the selected replacement item is compatible with the estimated future consolidated characteristics; and in response to determining that the selected replacement item is not compatible with the estimated future consolidated characteristics, determine an alternative replacement item of IT equipment.

* * * * *

UNITED STATES PATENT AND TRADEMARK OFFICE
CERTIFICATE OF CORRECTION

PATENT NO.        : 8,589,200 B2
APPLICATION NO.   : 13/171145
DATED             : November 19, 2013
INVENTOR(S)       : Nayan Bhagwanji Ruparelia et al.

Page 1 of 1

It is certified that error appears in the above-identified patent and that said Letters Patent is hereby corrected as shown below:

In the Claims

In column 8, line 25, in Claim 1, delete "of" and insert -- a set of --, therefor.

Signed and Sealed this
Fifteenth Day of April, 2014

Michelle K. Lee
*Deputy Director of the United States Patent and Trademark Office*